United States Patent
Subramanian et al.

(10) Patent No.: US 7,461,190 B2
(45) Date of Patent: Dec. 2, 2008

(54) NON-BLOCKING ADDRESS SWITCH WITH SHALLOW PER AGENT QUEUES

(75) Inventors: Sridhar P. Subramanian, Cupertino, CA (US); James B. Keller, Redwood City, CA (US); Ruchi Wadhawan, Sunnyvale, CA (US); George Kong Yiu, Sunnyvale, CA (US); Ramesh Gunna, San Jose, CA (US)

(73) Assignee: P.A. Semi, Inc., Santa Clara, CA (US)

( * ) Notice: Subject to any disclaimer, the term of this patent is extended or adjusted under 35 U.S.C. 154(b) by 134 days.

(21) Appl. No.: 11/201,581

(22) Filed: Aug. 11, 2005

(65) Prior Publication Data

US 2007/0038791 A1 Feb. 15, 2007

(51) Int. Cl.
*G06F 13/00* (2006.01)

(52) U.S. Cl. .................... 710/112; 710/107; 711/154

(58) Field of Classification Search .......... 710/107, 710/316–317, 112, 52; 711/147, 154
See application file for complete search history.

(56) References Cited

U.S. PATENT DOCUMENTS

| | | | |
|---|---|---|---|
| 4,897,833 A | 1/1990 | Kent et al. | |
| 5,392,434 A | 2/1995 | Bryant et al. | |
| 5,774,684 A | 6/1998 | Haines et al. | |
| 6,434,649 B1 | 8/2002 | Baker et al. | |
| 6,601,151 B1* | 7/2003 | Harris | 711/158 |
| 6,832,279 B1* | 12/2004 | Potter et al. | 710/112 |
| 7,028,115 B1 | 4/2006 | Rowlands et al. | |
| 2002/0032796 A1 | 3/2002 | Van Loo | |
| 2003/0065843 A1* | 4/2003 | Jones et al. | 710/107 |
| 2004/0165598 A1* | 8/2004 | Shrimali et al. | 370/395.42 |

FOREIGN PATENT DOCUMENTS

EP 1308862 5/2003

OTHER PUBLICATIONS

"PCI Express Base Specification", vol. 1, Rev. 1.0, Apr. 29, 2002, pp. 1-416, XP002403188.
International Search Report for PCT/US2006/031520, mailed Dec. 12, 2006, 12 pages.

* cited by examiner

*Primary Examiner*—Clifford Knoll
(74) *Attorney, Agent, or Firm*—Lawrence J. Merkel; Meyertons, Hood, Kivlin, Kowert & Goetzel, P.C.

(57) ABSTRACT

In one embodiment, a switch is configured to be coupled to an interconnect. The switch comprises a plurality of storage locations and an arbiter control circuit coupled to the plurality of storage locations. The plurality of storage locations are configured to store a plurality of requests transmitted by a plurality of agents. The arbiter control circuit is configured to arbitrate among the plurality of requests stored in the plurality of storage locations. A selected request is the winner of the arbitration, and the switch is configured to transmit the selected request from one of the plurality of storage locations onto the interconnect. In another embodiment, a system comprises a plurality of agents, an interconnect, and the switch coupled to the plurality of agents and the interconnect. In another embodiment, a method is contemplated.

26 Claims, 5 Drawing Sheets

| Transaction Type | Coherent Read | Coherent Write | Non-Coherent Posted | Non-Coherent Non-Posted | Non-Coherent Completion |
|---|---|---|---|---|---|
| Coherent Read | Yes (if no Addr Match) | Yes (if no Addr Match) | Yes | No | Yes |
| Coherent Write | Yes (if no Addr Match) | Yes (if no Addr Match) | No | Yes | Yes |
| Non-Coherent Posted | Yes | No | a) No b) Y/N | Yes | a) Y/N b) Yes |
| Non-Coherent Non-Posted | No | No | No | Y/N | Y/N |
| Non-Coherent Completion | Yes | No | a) No b) Y/N | Yes | a) Y/N | a) Read Request
b) IO Write, Config Write, CR Write

Fig. 4

NON-BLOCKING ADDRESS SWITCH WITH SHALLOW PER AGENT QUEUES

BACKGROUND

1. Field of the Invention

This invention is related to the field of integrated circuits and, more particularly, to arbitration mechanisms for interconnect within and/or between integrated circuits.

2. Description of the Related Art

Integrated circuits in a system, or various circuitry within an integrated circuit, typically have a need to communicate with each other. In many cases, communicators in the system/integrated circuit may communicate through various addresses in a memory map. That is, various communicators are assigned addresses within the memory map, and reads/writes to the addresses are used to communicate. Typically, such communicators use read/write transactions transmitted over an interconnect between the communicators. For example, it is common to have an address bus over which the address, command, and other transaction information is transmitted to initiate a transaction. Additionally, a data bus may be used to transmit data corresponding to the transaction, if any. If cache coherency is implemented for the transactions, a response interface may be provided for maintaining the coherency states according to the coherency scheme implemented by the communicators.

To the extent that the interconnect, or a portion thereof, is shared among communicators, some mechanism for arbitrating among the communicators for use of the interconnect is needed. In the past, centralized and distributed arbitration mechanisms have been used. In a centralized arbitration mechanisms, all communicators transmit a request signal to a central arbiter, which determines which communicator is to be granted use of the interconnect (the "arbitration winner"). The central arbiter returns a grant signal to the granted communicator, and the granted communicator then drives its transaction on the interconnect. In a distributed arbitration scheme, each communicator implements a local arbiter (or a local arbiter is included nearby). Each communicator asserts its request signal to all local arbiters. The local arbiters are designed to independently determine the same arbitration winner. The local arbiter of the granted communicator informs the granted communicator, which drives its transaction onto the interconnect.

The centralized arbitration mechanism is typically simpler to implement than the distributed arbitration mechanism. However, the centralized arbitration mechanism is also typically a higher latency mechanism. The centralized arbitration mechanism includes a potentially long distance transmission of a request signal, followed by an equally long distance transmission of a grant signal, followed by the granted communicator driving its transaction. On the other hand, the more complex distributed arbitration scheme may only involve one long distance transmission (of a request signal to each of the local arbiters). Complexities in the distributed arbitration mechanism typically includes more complex "parking" of the grant on a particular communicator, complexities in flow controlling the communicators, and allocation of buffers in targeted communicators on a per-source-communicator basis.

SUMMARY

In one embodiment, a switch is configured to be coupled to an interconnect. The switch comprises a plurality of storage locations and an arbiter control circuit coupled to the plurality of storage locations. The plurality of storage locations are configured to store a plurality of requests transmitted by a plurality of agents. The arbiter control circuit is configured to arbitrate among the plurality of requests stored in the plurality of storage locations. A selected request is the winner of the arbitration, and the switch is configured to transmit the selected request from one of the plurality of storage locations onto the interconnect. In another embodiment, a system comprises a plurality of agents, an interconnect, and the switch coupled to the plurality of agents and the interconnect.

In still another embodiment, a method comprises queuing requests from a plurality of agents in a plurality of storage locations; arbitrating among the requests in the plurality of storage locations to select a request of the plurality of requests; and transmitting the selected request on an interconnect.

BRIEF DESCRIPTION OF THE DRAWINGS

The following detailed description makes reference to the accompanying drawings, which are now briefly described.

FIG. 4 is a table illustrating ordering rules for one embodiment.

Figure 1:
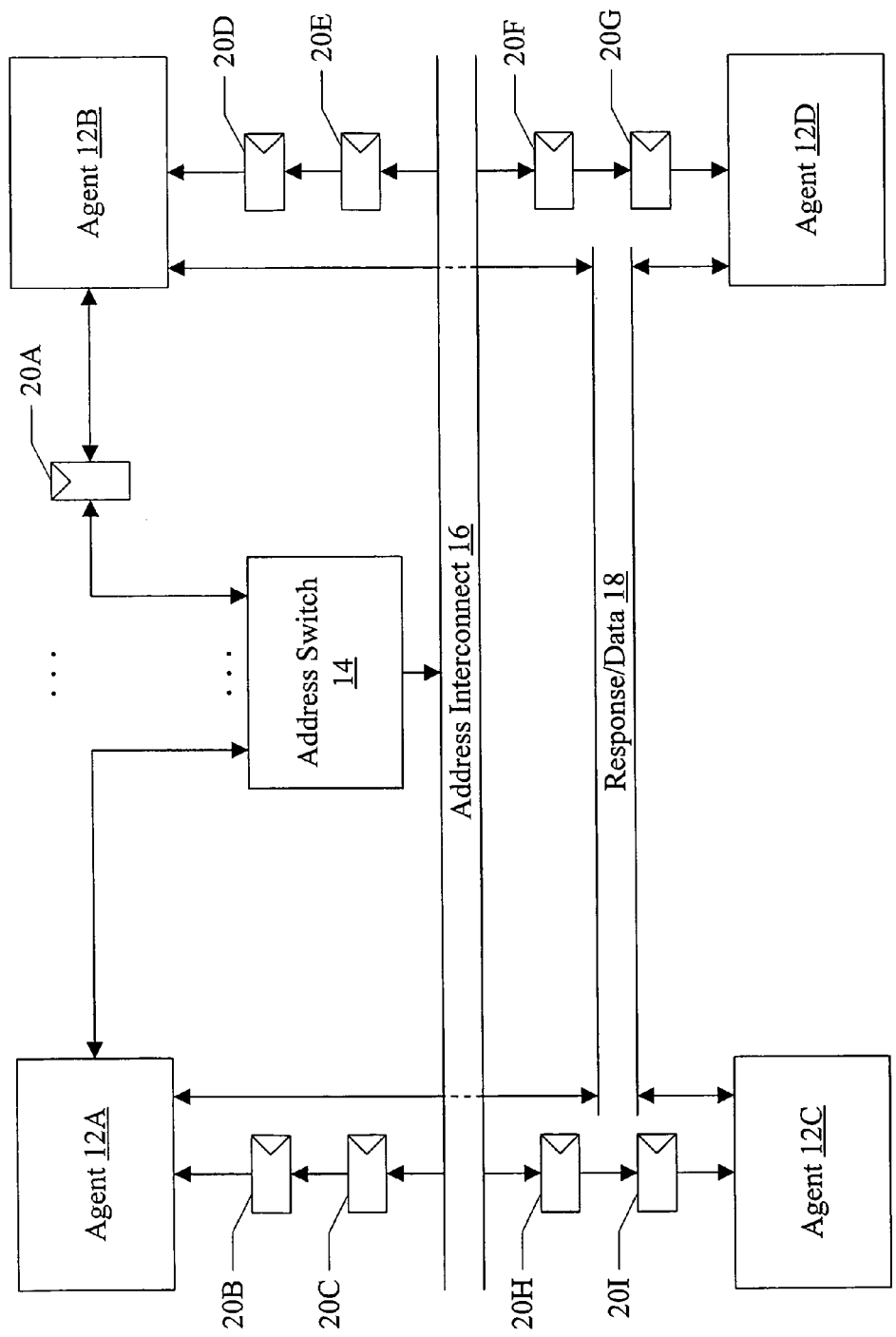
FIG. 1 is a block diagram of one embodiment of an integrated circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by. the appended claims.

DETAILED DESCRIPTION OF EMBODIMENTS

Turning now to FIG. 1, a block diagram of one embodiment of a system 10 is shown. In the illustrated embodiment, the system 10 includes a plurality of agents such as agents 12A-12D. The system also includes an address switch 14, an address interconnect 16, and a response/data interconnect 18. The agents 12A-12B are coupled to the address switch 14 (where the agent 12B is coupled through a flop 20A in the illustrated embodiment). The address switch 14 is further coupled to the address interconnect 16, which is coupled to the agents 12A-12D (through flops 20B-20I in the illustrated embodiment). Viewed in another way, the flops 20B-20I may be part of the address interconnect 16. The agents 12A-12D are also coupled to the response/data interconnect 18. In one embodiment, the system 10 may be integrated onto a single integrated circuit chip. In other embodiments, various components of the system 10 may be implemented on separate integrated circuits. Any level of integration may be used in various embodiments.

The agents 12A-12B are configured to transmit requests that are to be transmitted on the address interconnect 16 to the address switch 14. Each request may include the address of the transaction and the command (that identifies the transaction to be performed). Various commands may be supported, such as coherent read and write commands, noncoherent read and write commands, coherent ownership commands, probe commands, synchronization commands, cache management commands, etc. Requests may also include other information in various embodiments. For example, in one embodiment described in more detail below, the requests may include a priority level of the request (for arbitration) and an indication of whether or not the data for this request is to be copied to level 2 cache as well.

The agents 12A-12B may be referred to a source agents, since they may initiate transactions in the system 10 by transmitting a request for the address interconnect 16. Exemplary source agents may include processors, external write back caches (which source write transactions to write evicted cache blocks that have been modified to memory), and input/output (I/O) bridges (which source transactions on behalf of peripheral devices to which they are coupled). As illustrated by the ellipses in FIG. 1, various embodiments may include more than two source agents (or source/target agents, described below). Other agents may not source transactions, but may be the target of a transaction (that is, the agent that receives the transaction and is responsible for the data of the transaction). Such agents are referred to as target agents. For read transactions, the target agent supplies the data unless another agent has a more recent (modified) cached copy of the data. For write transactions, the target agent sinks the write data supplied by the source agent. Target agents may include, for example, memory controllers and I/O bridges. Some agents may be both a source agent for some transactions and a target agent for other transactions. Exemplary source/target agents may include the I/O bridge or external cache mentioned above. Generally, an agent may comprise any circuitry that is configured to communicate via transactions on the address interconnect 16 and the response/data interconnect 18.

Each source agent 12A-12B (or source/target agent, although source agent will be used for brevity in this description) may use a request signal to indicate that the source agent 12A-12B is transmitting a request. The address switch 14 may also assert a grant signal to a given source agent 12A- 1 2B to indicate that a request transmitted by that source agent 12A-12B has been granted onto the address interconnect 16.

The address switch 14 may include a plurality of storage locations configured to store requests transmitted by the source agents until the requests are granted onto the address interconnect 16. In one embodiment, the storage locations may comprise a plurality of queues. Each queue may correspond to a particular source agent, and may be dedicated to storing requests transmitted by that source agent. That is, there may be a one-to-one correspondence between queues and source agents. The queue for a given source agent may store a plurality of requests transmitted to the address switch 14 by the given source agent. Each source agent may be aware of the number of queue entries in the queue corresponding to that source agent, and may not transmit more requests than there are queue entries.

The address switch 14 may also be configured to arbitrate among the requests in the queues to select a request for transmission on the address interconnect 16. Any arbitration scheme may be employed. For example, in some embodiments, each request may have a priority level assigned to it. The arbitration scheme may be a strict priority scheme (selecting the highest priority request) with starvation prevention mechanisms to avoid starving lower priority requests. The address switch 14 may drive the selected request on the address interconnect 16.

Thus, the address switch 14 may employ centralized arbitration for the address interconnect 16. However, since the requests are transmitted to the address switch 14 and are driven onto the address interconnect 16 by the address switch 14, the latency associated with returning a grant to the source agent selected to win the arbitration (and the source agent driving the address interconnect 16 in response to the grant) may be lessened, in some embodiments. The address switch 14 may return a grant to the source agent in parallel with driving the selected request onto the address interconnect 16. Additionally, in some embodiments, the arbitration circuitry in the address switch 14 may have more information about the requests since the requests themselves are queued in the address switch 14 (e.g. as compared to a request/grant structure typically implemented in a conventional centralized arbiter).

When a source agent receives a grant from the address switch 14, the source agent is informed that a queue entry is available for storing another request. In one embodiment, requests from a given source agent may be granted in the order transmitted. Thus, the source agent that receives a grant may associate the grant with the corresponding request. In other embodiments, the address switch 14 may be configured to reorder the requests in some cases (transmitting a later-received request from a source agent ahead of, or prior to, an earlier-received request from the same source agent). In such embodiments, the source agents may be coupled to the address interconnect 16, and may receive the requests transmitted thereon to determine which request was granted. For example, in some embodiments, the source agent may tag each request with a source tag and the source agent may receive the source tag from the address interconnect 16 to determine which request was granted.

The address interconnect 16 may comprise any communication media, in various embodiments. For example, the address interconnect 16 may comprise a packet interface, in which a request is transmitted as a packet over one or more clock cycles on the address interconnect 16. Particularly, in one embodiment, the address packet may be transmitted in one clock cycle on the address interconnect 16. Such embodiments may insulate the address switch 14, somewhat, from the protocol of the address phase of a transaction. Other embodiments may implement the address interconnect 16 as a bus, with an address transferred along with various control signals to indicate the command and other control information transferred during the address phase.

Requests are broadcast to agents 12A-12D on the address interconnect 16. In some embodiments, the flight time on the address interconnect 16 to the farthest agent 12A-12D (in terms of physical distance) may exceed a clock cycle of the clock associated with the address interconnect 16. Flops 20B-20I may be used to capture the request and continue its propagation to the agents 12A-12D. Thus, the number of flops 20B-20I included between the address switch 14 and a given agent 12A-12B may be based on the flight time to the farthest agent (in numbers of clock cycles of the clock signal used for the address interconnect 16). In the illustrated embodiment, the flight time exceeds two clock cycles and thus two flops are used. Other embodiments may include zero flops (if the flight time is less than a clock cycle), one flop (if the flight time exceeds one clock cycle but is less than two clock cycles), or more than two flops (dependent on the flight time). To ensure that a given request is logically received by each agent 12A-12D on the same clock cycle, an equal number of flops 20B-20I may be provided between the address switch 14 and each agent 12A-12D even though some agents may be physically nearer to the address switch 14 and the request may be physically capable of arriving at the nearer agent in a shorter flight time. The flops 20B-20I to the farther agents may be physically distributed along the distance between the address switch 14 and the farther agents. FIG. 1 does not attempt to illustrate the physical distribution of the flops 20B-20I, for simplicity in the drawing.

Since each agent 12A-12D logically receives the requests transmitted on the address interconnect 16 on the same clock cycle, the address interconnect 16 may, in some embodiments, be the point of coherency in space for coherent transactions. That is, the order of requests successfully transmitted on the address interconnect 16 may define the order of transactions for coherency purposes.

Similarly, in some embodiments, a flight time of a request from a source agent 12A-12B to the address switch 14 may exceed a clock cycle. In some embodiments, the address switch 14 may be physically placed nearest the source agents that are expected to have the highest bandwidth of requests (e.g. processor agents may typically have higher request bandwidth than cache agents are I/O agents). In the embodiment of FIG. 1, the flight time of requests from the source agent 12B may exceed a clock cycle, and thus the flop 20A may be used to capture the request and continue its propagation to the address switch 14. Similarly, the grant signal returned by the address switch 14 may be captured by the flop 20A and propagated on the following clock cycle.

Since, in the present embodiment, the address interconnect 16 is the point of coherency for coherent transactions (and may also define the order for requests as a whole), there is no ordering among requests transmitted to the address switch 14 from different agents. Accordingly, if a flop such as flop 20A is used for a flight time from one source agent, flops need not be inserted for other agents whose flight time for requests is less than a clock cycle.

As mentioned above, source agents may receive requests on the address interconnect 16, in some embodiments, to determine which request of multiple requests outstanding in the address switch 14 from a given agent was actually granted on to the address interconnect 16. Additionally, in some embodiments, source agents which may also cache data (and thus may participate in coherent transaction) may also snoop other source agent's requests on the address interconnect 16 for coherency purposes. Target agents, such as agents 12C-12D, are coupled to the address interconnect 16 to receive requests for which they are the target.

In one embodiment, the address switch 14 may also be configured to manage flow control to various target agents 12C-12D. For example, the address switch 14 may be configured to determine which target agent is addressed by each request (e.g. via coarse-grain decode of the request address and mapping the address to a target agent based on the decode). The address switch 14 may be aware of the number of requests that may be queued in a target agent (after receipt of the requests from the address interconnect 16) and may ensure that the target agent's input queues are not overflowed with requests. If a given request is targeted to a given target agent whose input queue is full, the address switch 14 may ensure that the given request is not selected as the winner of arbitration until an input queue entry is available in the given target agent. The address switch 14 may be non-blocking of other requests in such a situation. That is, the address switch 14 may still be able to select another request targeted at another target agent if an earlier request or higher priority request is not eligible to win arbitration due to the target agent not being able to receive the request. In some embodiments, the address switch 14 may also attempt to implement fairness or optimize access to a target agent among the source agents.

The agents 12A-12D may also be coupled to a response/data interconnect 18 for communicating the response phase and data phase of transactions initiated via requests on the address interconnect 16.- Some transactions may not include a data phase, in various embodiments. The response phase may include, for example, responses from caching agents for coherent transactions. The responses may provide information indicating which coherency state should be established in the receiver of data corresponding to a transaction. The data phase of the transaction involves the transfer of data to the source agent (for a read) or the target agent (for a write). The response/data interconnect 18 may comprise an communication media, in various embodiments.

While the storage locations in the address switch 14 are described as per-agent queues in some embodiments above, other embodiments may implement the storage locations in other fashions. For example, the storage locations may be a single queue into which the source agents store requests. The queue entries may be flexibly assigned to source agents by the address switch 14, and there may be additional signaling to indicate the number of queue entries available to each source agent (e.g. signaling from the address switch 14 to each agent indicating the number of queue entries, or that at least one additional queue entry is available for the agent, etc.). Agents may be grouped and may share queues, or queues may be allocated based on the target of each request.

It is noted that, while the flops 20A-20I are illustrated in the embodiment of FIG. 1, generally any clocked storage device may be used as the devices 20A-20I. For example, registers, latches, etc. may be used. A clocked storage device may comprise any storage device that is configured to capture a value for storage responsive to a clock signal. In the present embodiment, the clock signal input for the flops 20A-20I may be the clock used for the address interconnect 16. Some agents may operate internally at multiples of the clock. Other flops described herein may also be implemented with any clocked storage device. Generally, each flop 20A-20I may have a bit width equal to the width of its input. For example, the flop 20A may be the width of the request/grant interface to the address switch 14 and the width of the flops 20B-20I may be the width of the address interconnect 16.

While a strict priority arbitration scheme is used as an example above, other embodiments may implement other arbitration schemes. For example, other arbitration schemes may include round-robin, priority weighted round-robin, combinations of round-robin and priority schemes, etc.

While the above discussion refers to an address switch that receives requests for the address interconnect 16 and arbitrates among the requests to determine an arbitration winner to be transmitted on the address interconnect 16, other embodiments may implement a similar switch for the data interconnect. The requests to the data switch may be received from data sources. The requests may include the data for a transaction, along with a tag identifying the address request to which the data corresponds. The requests may include a priority, which may be the same priority as the address request or a different priority, in various embodiments. The data switch may arbitrate among the queued data requests to select an arbitration winner to drive on the data interconnect.

Figure 2:
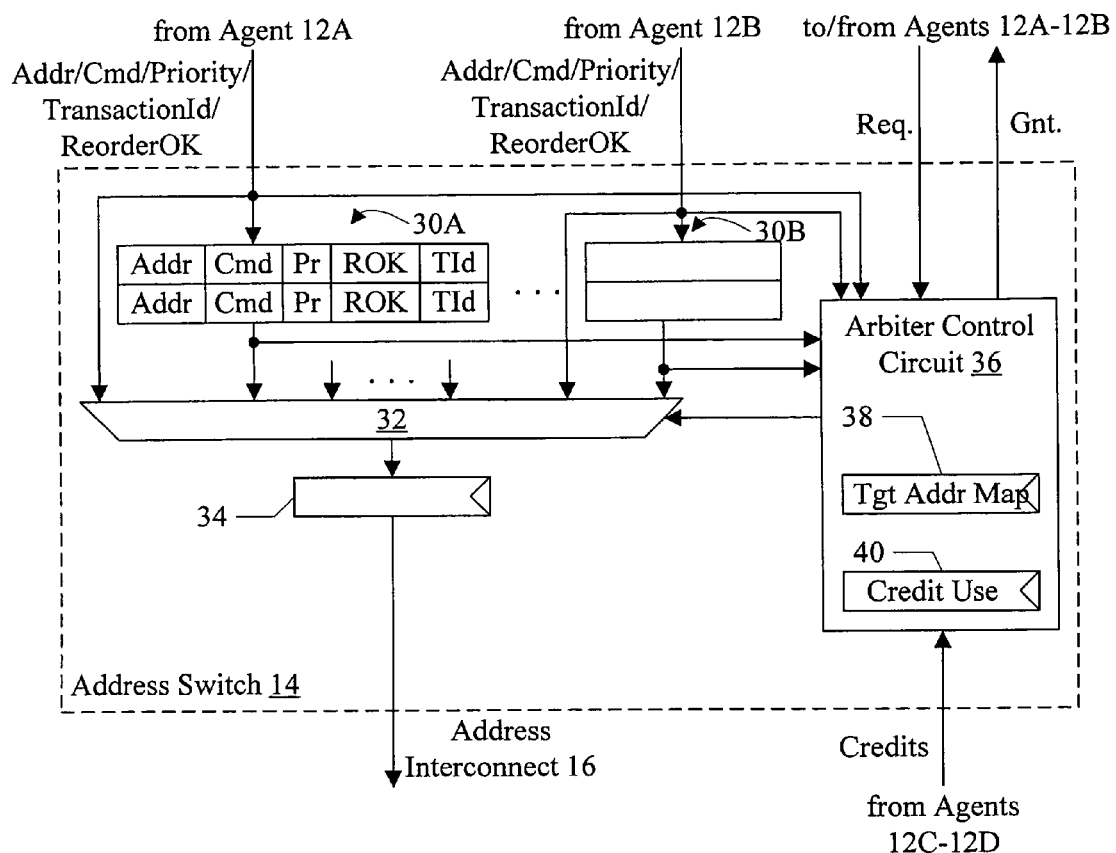
FIG. 2 is a block diagram of one embodiment of an arbiter/address switch shown in FIG. 1.

Turning now to FIG. 2, a block diagram of one embodiment of the address switch 14 is shown. In the illustrated embodiment, the address switch 14 includes queues such as queues 30A and 30B corresponding to the agents 12A and 12B, respectively. The address switch 14 further includes a multiplexor (mux) 32, an output flop 34, and an arbiter control circuit 36. The queues 30A-30B are coupled to receive a request from their respective agents 12A-12B. Additionally, the arbiter control circuit 36 and the mux 32 are coupled to receive the requests in the illustrated embodiment. The queues 30A-30B are further coupled to the arbiter control circuit 36 and the mux 32. In embodiments that include additional source agents, the mux 32 and the arbiter control circuit 36 may be further coupled to receive the requests and the outputs of corresponding queues in the address switch 14. The arbiter control circuit 36 is coupled to receive request signals from the agents 12A-12B, and to provide grant signals to the agents 12A-12B. The arbiter control circuit 36 is further coupled to provide a selection control to the mux 32. The output of the mux 32 is coupled to the output flop 34, which is further coupled to the address interconnect 16. The arbiter control circuit 36 is further coupled to receive credit indications from the agents 12C-12D (and other target agents or source/target agents, in some embodiments).

In the illustrated embodiment, each request may include an address (Addr), a command (Cmd), a priority (Pr), a transaction ID (TId), and a ReorderOK bit (ROK). The queues 30A-30B may be configured to store the request. That is, each queue entry may include storage sufficient to store the request. In the illustrated embodiment, each queue 30A-30B includes two entries. In other embodiments, more entries may be included in each queue 30A-30B. The address is the address in the memory map that is affected by the request, and identifies the target agent. The command identifies the transaction being initiated. The priority indicates the priority level of the request. In one embodiment, three priority levels are used. The highest priority level may be used when latency of the request is critical. For example, in one embodiment, some I/O bridges that are coupled to packet interfaces such as Ethernet interfaces may use the highest priority level to read descriptors or packet data when buffers in the bridge or circuitry driving the packet interfaces are running low. The medium priority level may be used for processor reads and direct memory access (DMA) descriptor reads by I/O bridges. The medium priority may also be used for writes if the source agent's write buffers are becoming close to full. The low priority level may be used for all other requests (e.g. processor writes, high bandwidth reads and writes such as DMA reads and writes, etc.). Other embodiments may use more or fewer priority levels. The reorderOK bit may be used to indicate if the request may be reordered ahead of a previous request from the same agent, if the previous request is still in the agent's queue 30A-30B (i.e. the previous request has not yet been granted onto the address interconnect 16). The source agent may generate the reorderOK bit according to a set of ordering rules implemented by the agent. An example is illustrated in FIG. 4 and discussed in more detail below.

The agents 12A-12B may assert a corresponding request signal when transmitting a request to the address switch 14. That is, the asserted request signal may serve as a valid bit for the request, for writing the queue 30A-30B corresponding to the agent 12A-12B and for indicating the request to the arbiter control circuit 36. The arbiter control circuit 36 may also generate a grant signal (one for each source agent 12A-12B). The arbiter control circuit 36 may assert the grant signal to a given source agent 12A-12B to indicate that a request from that source agent 12A-12B has been granted and will be driven on the address interconnect 16. The asserted grant signal may indicate to the agent 12A-12B that a queue entry in the agent's queue 30A-30B is freeing up to accept another request.

Each agent 12A-12B may be configured to transmit up to a number of requests equal to the number of queue entries in its queue 30A-30B (two, in the illustrated embodiment). In one embodiment, each agent 12A-12B may limit the number of requests outstanding in the queue 30A-30B to the number of entries. That is, the agent may transmit two requests, and then inhibit transmitting additional requests until an asserted grant signal indicates that a queue entry is being freed. In another embodiment, each agent 12A-12B may fill its queue 30A-30B and transmit one more request, which the agent 12A-12B may continue transmitting until a previous request is granted and thus the asserted request is written to a queue entry.

The arbiter control circuit 36 may arbitrate among the requests in the queues 30A-30B and select a request to be transmitted on the address interconnect 16. The arbiter control circuit 36 may generate the selection control to the mux 32 to select the request and provide the selected request to the output flop 34. The output flop 34 drives the request onto the address interconnect 16. The output flop 34 may be provided to ensure that the request is driven onto the address interconnect 16 at the beginning of the clock cycle. In other embodiments, the output flop 34 may be eliminated and the request may be driven upon selection through the mux 32. The selected request is also deleted from its queue 30A-30B, and the arbiter control circuit 36 may assert the grant signal to the corresponding source agent 12A-12B.

The arbiter control circuit 36 may implement any arbitration scheme to select among the requests. For example, as mentioned above, the arbiter control circuit 36 may implement a strict priority selection with starvation prevention. In such a scheme, the highest priority request is normally selected as the winner of the arbitration. However, if numerous higher priority requests are causing lower priority requests to remain in the queues 30A-30B for a prolonged period (that is, lower priority requests are "starved"), a lower priority request may be selected. The starvation prevention mechanism may be implemented in a variety of fashions. For example, each request may have a timer associated with it, or a timestamp, which indicates how long the request has been in the queues 30A-30B. If the request has been in the queues 30A-30B longer than a threshold time period (which may be fixed or programmable), the request may be selected. Effectively, the request's priority may be increased due to its age in the queues 30A-30B. In another example, if a defined number of higher priority requests are selected consecutively (where the number may be fixed or programmable), a lower priority request may be automatically selected. If more than one request has the highest priority in the queues 30A-30B for a given arbitration, any mechanism may be used to select among the requests (e.g. fixed priority among the source agents, round-robin among the source agents, the oldest request may be selected, etc.). Other embodiments may implement other arbitration schemes (e.g. round-robin without priority, weighted round-robin based on priority, etc.).

If a high priority request is in a queue 30A-30B "behind" another request, that high priority request may be ineligible for arbitration if the ReorderOK bit for that high priority request is not set to indicate that reordering of the request ahead of a previous request is permissible. That is, the arbiter control circuit 36 may not select the high priority request ahead of a previous lower priority request in the same queue if the ReorderOK bit does not indicate that reordering is permissible. If reordering ahead of a previous request is permissible, as indicated by the ReorderOK bit, the high priority request may be selected if the higher priority request is behind a lower priority request in the queue. That is, the lower priority request may have been transmitted by the agent to the address switch prior to transmitting the high priority request.

In some embodiments, the arbiter control circuit 36 may also implement flow control to each target agent (e.g. the agents 12C-12D, in the embodiment of FIG. 1). The arbiter control circuit 36 may determine the target agent for each request (e.g. using the address in the present embodiment). The arbiter control circuit 36 may be programmable with a mapping of addresses to target agents. For example, one or more registers 38 may be programmed to map the address space to target agents. Based on the address mapping, the address control circuit 36 may perform a coarse-grain decode of certain most significant address bits to determine the target agent. The decode is coarse-grained in the present embodiment because relatively large contiguous address ranges are expected to be programmed to the same target agent. Other embodiments may use a finer grain decode. Furthermore, while the decode is programmable in this embodiment, other embodiments may have a fixed address map and the arbiter control circuit 36 may decode addresses according to the fixed address map.

Each target agent may have the ability to accept up to a certain number of transactions (e.g. according to the number of buffers implemented in the target agent). In some embodiments, transactions may be grouped by transaction type and the number of each group of transactions may be specified for each target agent. For example, in one embodiment, the transactions may be grouped as coherent reads, coherent writes, non-posted noncoherent commands, and posted non-coherent commands. Each target agent may implement a certain number of buffers for each of the above groups of transactions.

The arbiter control circuit 36 may be configured to implement flow control to the target agents, to ensure that the target agent's buffers are not overflowed. For example, a credit-based system may be used in which each buffer is represented by a credit for the corresponding transaction type. The arbiter control circuit 36 may track the available credits (e.g. using one or more registers 40 in FIG. 2). If the arbiter control circuit 36 selects a request of a given type and targeted at a given target agent, the arbiter control circuit 36 may reduce the corresponding credit count by one. The target agents may also communicate the return of credits when buffers are free (shown as credits in FIG. 2). Thus, at any given point in time, the arbiter control circuit 36 may be aware of buffer availability in each target agent for each transaction type. The arbiter control circuit 36 may prevent the selection of a request if the credit that would be consumed by that request is not available. Another request (even a lower priority request) may be selected instead if the corresponding credit for that other request is available.

In some embodiments, the arbiter control circuit 36 may also attempt to ensure fairness of access by source agents to a given target agent. The arbiter control circuit 36 may track the overall use of credits of various types for each target agent, as well as the use of credits by each source agent. If overall use of credits for a target agent is high (indicating that the target agent is "busy" with transactions) and a particular source agent is communicating at a high rate with that target agent (indicated by its use of credits for that target agent), the arbiter control circuit 36 may limit the usage of credits by that source agent/target agent pair to permit better access to the target agent by other source agents.

As illustrated in the embodiment of FIG. 2, the mux 32 and the arbiter control circuit 36 are coupled to receive the request currently being transmitted by an agent 12A-12B to the address switch 14. The arbiter control circuit 36 may be configured to bypass the queues 30A-30B for a given request, and select the request through the mux 32, if the queues 30A-30B are empty when the request is transmitted (and the corresponding credit for the target agent is available for consumption). The latency of passing through the queue may be avoided in such cases. In other embodiments, the bypass may be provided only for one source agent, or a subset of the source agents (e.g. the processors may have the bypass and other agents may not). In still other embodiments, bypassing may not be implemented and the connection of the incoming requests to the mux 32 and the arbiter control circuit 36 may be eliminated.

It is noted that, while the present embodiment uses the ReorderOK bit to indicate if a given request may be reordered ahead of a previously-transmitted request from the same agent, other embodiments may use other indications. For example, if more than two queue entries are implemented in a queue 30A-30B, there may be a ReorderOK bit corresponding to each entry in the queue. Each ReorderOK bit may indicate if the request is reorderable with respect to the request in the corresponding queue entry. Alternatively, the arbiter control circuit 36 may implement the set of ordering rules that apply to the agent in determining if a given request may be reordered ahead of previously transmitted requests.

Figure 3:
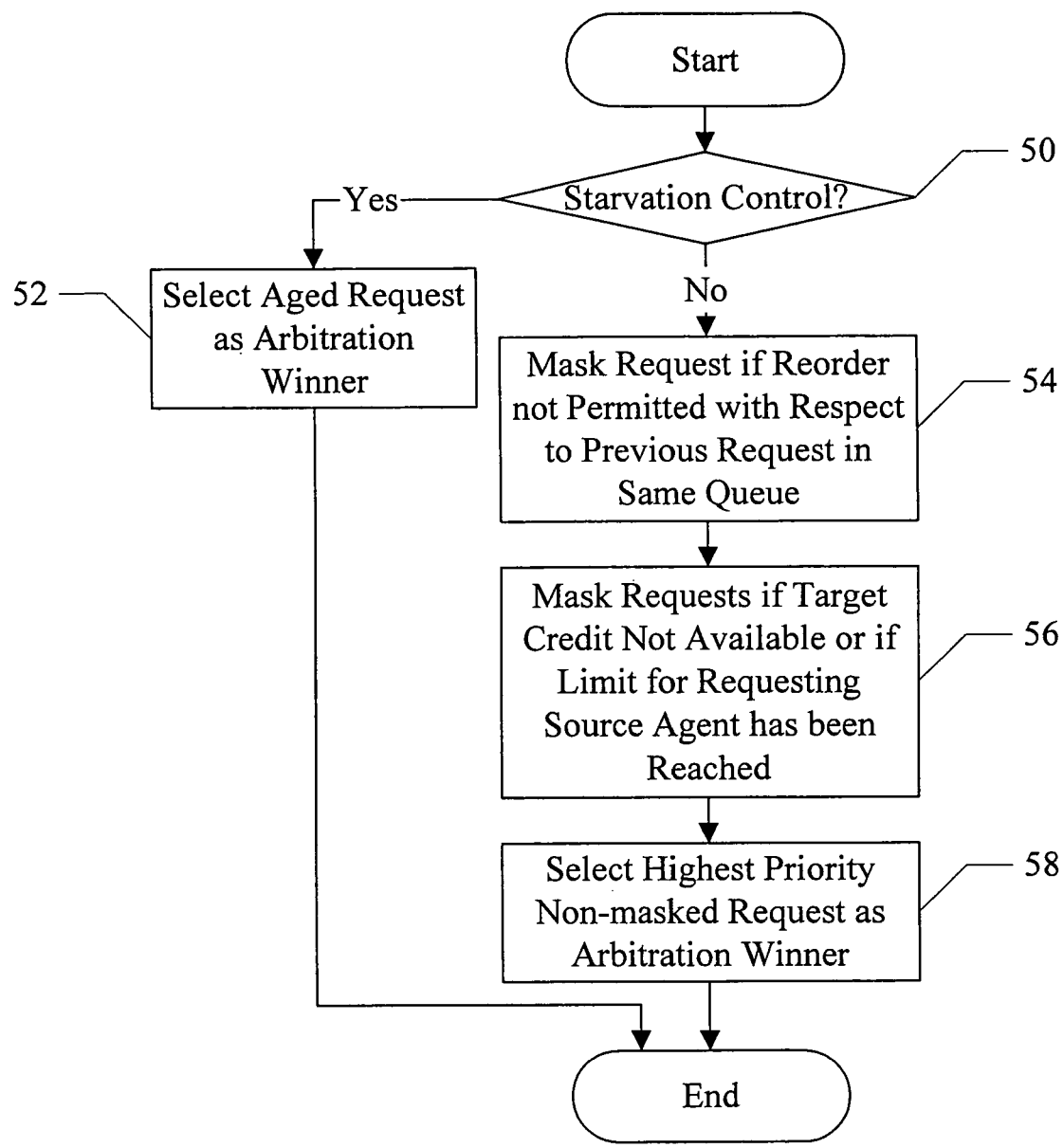
FIG. 3 is a flowchart illustrating operation of one embodiment of an arbiter control unit shown in FIG. 2 for arbitrating among requests.

FIG. 3 is a flowchart illustrating operation of one embodiment of the arbitration control circuit 36. While the blocks are shown in a particular order for ease of understanding, any order may be used. Furthermore, various blocks may be implemented in parallel by combinatorial logic circuitry in the arbitration control circuit 36. Other blocks, combinations of blocks, or the flowchart as a whole may be pipelined over multiple clock cycles, as desired.

The arbitration control circuit 36 may override the "normal" (e.g. priority based) arbitration if starvation control is being activated for the current arbitration cycle (decision block 50). As mentioned above, starvation control may be activated if a given lower priority request has been in the queue for a prolonged period. Alternatively, starvation control may be activated if high priority requests are selected over a number of consecutive arbitrations. If starvation control has been activated (decision block 50, "yes" leg), the arbitration control circuit 36 may select the aged request (or a lower priority request) as the arbitration winner (block 52).

If starvation control has not been activated (decision block 50, "no" leg), the arbiter control circuit 36 may mask various requests as being ineligible for arbitration, and may arbitrate among the requests that have not been masked. For example, if a request in the queue has its ReorderOK bit indicating that reordering is not permitted, and there is a previous request in the same queue, the request may be masked to prevent it from being selected prior to the previous request (e.g. if that request is higher priority than the previous request) (block 54). Additionally, if a request is targeted at a target agent for which no credit of the appropriate type for the request is available, the request may be masked (block 56). If the arbitration control circuit 36 is limiting the credits that may be consumed by the source agent corresponding to a request and the limit has been reached, the request may also be masked even though there may be credits available for consumption (block 56). The arbitration control circuit 36 may select the highest priority non-masked request (block 58) as the arbitration winner.

The arbitration control circuit 36 may select the arbitration winner through the mux 32 onto the address interconnect 16. Additionally, the arbitration control circuit 36 may assert the grant signal to the source agent that sourced the selected request, and may delete the selected request from the queue 30A-30B.

FIG. 4 is a block diagram of one embodiment of a set of ordering rules that may be implemented by a source agent, or the arbitration control circuit 36, or both, in various embodiments. Transaction types are shown across the top of a table and down the left side of the table. At the intersection of the row and column is the rule on whether or not a transaction of the type in that row is permitted to be reordered ahead of a previous transaction of the type in that column.

Accordingly, coherent read and write requests may be freely reordered as long as there is no address match. In this context, an address match is detected on the granularity for which coherency is maintained (e.g. a cache block). A coherent read request may be reordered ahead of a non-coherent posted request and a non-coherent completion, but not a non-coherent non-posted request (coherent read row and non-coherent posted, non-coherent non-posted, and non-coherent completion columns). In some cases, whether or not a request may be reordered is dependent on specific instance of a request (intersections that include a) and b) answers). The type of request for a) and b) is defined below the table in FIG. 5. Y/N means that reordering is permissible, but not required to be allowed. Thus, requests may be reordered if FIG. 4 indicates yes or Y/N.

Figure 5:
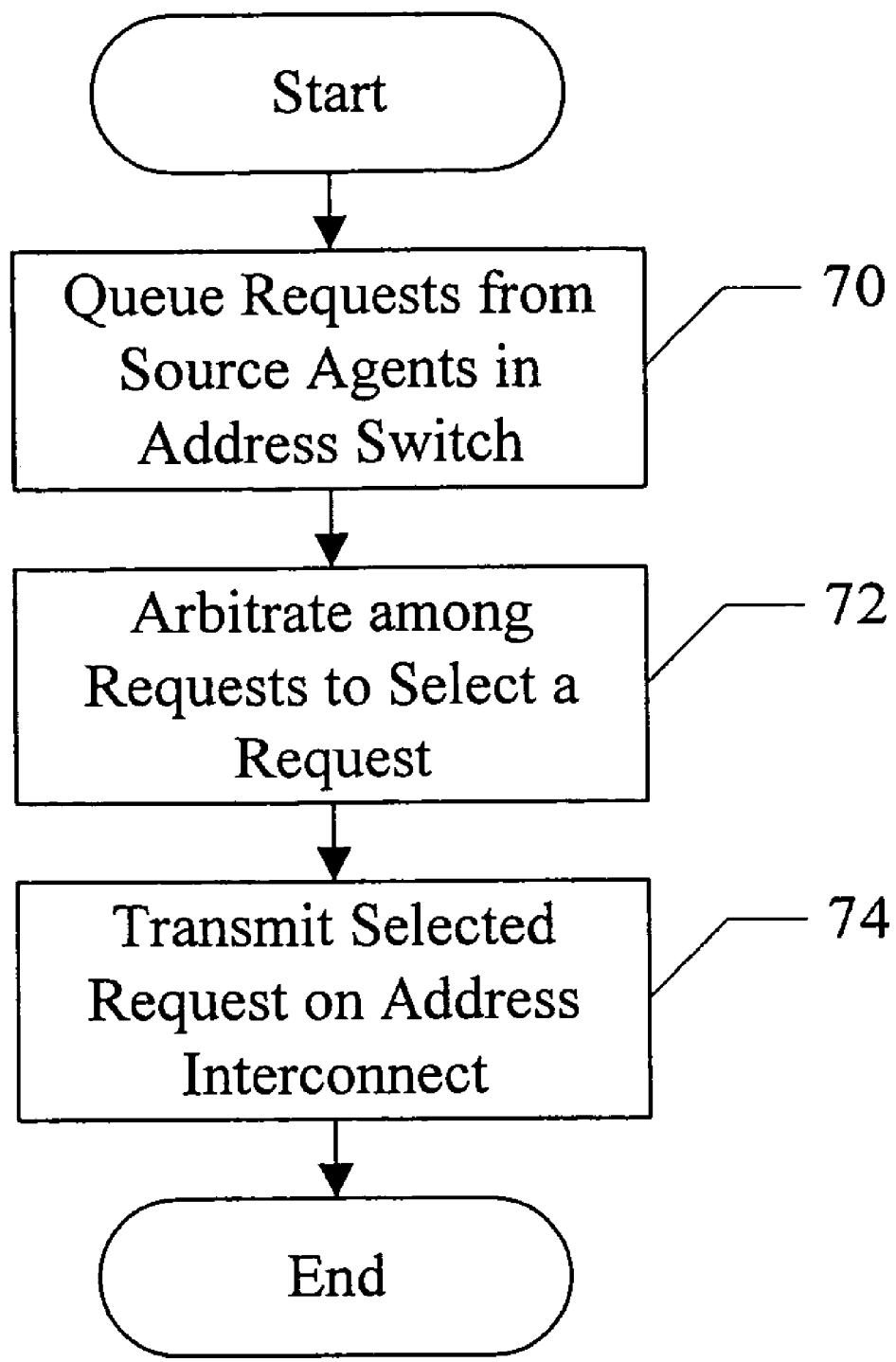
FIG. 5 is a high level flowchart of a method of communicating requests on an address interconnect.

Turning next to FIG. 5, a high level flowchart of a method of communicating requests on an address interconnect is shown. The requests from source agents are queued in an address switch (block 70). The address switch arbitrates among the queued requests to select a request (block 72). The selected request is transmitted on the address interconnect (block 74).

Numerous variations and modifications will become apparent to those skilled in the art once the above disclosure is fully appreciated. It is intended that the following claims be interpreted to embrace all such variations and modifications.

What is claimed is:

1. A switch configured to be coupled to an interconnect, the switch comprising:
a plurality of storage locations, wherein the plurality of storage locations are configured to store a plurality of requests transmitted by a plurality of agents; and
an arbiter control circuit coupled to the plurality of storage locations, wherein the arbiter control circuit is configured to arbitrate among the plurality of requests stored in the plurality of storage locations, and wherein the switch is configured to transmit a selected request from one of the plurality of storage locations onto the interconnect, and wherein the selected request is a winner of the arbitration, and wherein an indication included with a first request transmitted by a first agent is indicative of whether or not the first request is reorderable with a second request that the arbiter control circuit determines was previously transmitted by the first agent, and wherein the arbiter control circuit is configured to select the first request as the winner of the arbitration prior to selecting the second request as the winner of the arbitration responsive to the indication indicating that the first request is reorderable with the second request.

2. The switch as recited in claim 1 wherein the plurality of storage locations comprise a plurality of queues, wherein each of the plurality of queues corresponds to a respective agent of the plurality of agents and is configured to store requests transmitted by the respective agent, wherein each of the plurality of queues comprises at least two of the plurality of storage locations.

3. The switch as recited in claim 1 wherein each request has a corresponding priority, and wherein the arbiter control circuit is configured to select the first request prior to selecting the second request if the first request is higher priority than the second request.

4. The switch as recited in claim 1 wherein the arbiter control circuit is configured to determine a target agent for each request of the plurality of requests, and wherein, if one request of the plurality of requests is blocked based on the target agent of the request, the arbiter control circuit is configured to select another request to another target agent as the selected request.

5. The switch as recited in claim 4 wherein the arbiter control circuit is configured to decode a portion of an address of each of the plurality of requests to determine the target agent for each request.

6. The switch as recited in claim 1 wherein the interconnect is an address interconnect.

7. The switch as recited in claim 1 wherein the interconnect is a data interconnect.

8. A system comprising:
a plurality of agents;
an interconnect; and
a switch coupled to the plurality of agents and the interconnect, wherein the switch comprises a plurality of storage locations, and wherein the plurality of storage locations are configured to store a plurality of requests transmitted by the plurality of agents to the switch, and wherein the switch is configured to arbitrate among the plurality of requests stored in the plurality of storage locations, and wherein the switch is configured to transmit a selected request on the interconnect, wherein the selected request is a winner of the arbitration; and
wherein the interconnect comprises one or more clocked storage devices coupled between the switch and each of the plurality of agents that receives requests on the interconnect, whereby each of the plurality of agents receives the selected request from the switch during a same clock cycle, wherein a number of the one or more clocked storage devices is based on a flight time of the request to a farthest receiving agent from the switch, wherein the flight time exceeds a clock cycle time in length, and wherein a flight time to at least one of the plurality of agents is less than the clock cycle time in length.

9. The system as recited in claim 8 wherein the plurality of storage locations comprise a plurality of queues, wherein each of the plurality of queues corresponds to a respective agent of the plurality of agents and is configured to store requests transmitted by the respective agent, wherein each of the plurality of queues comprises at least two of the plurality of storage locations.

10. The system as recited in claim 8 wherein the switch is configured to select a first request transmitted by a first agent of the plurality of agents as the selected request prior to selecting a second request, wherein the second request is transmitted by the first agent prior to the first request.

11. The system as recited in claim 10 wherein each request has a corresponding priority, and wherein the switch is configured to select the first request prior to selecting the second request if the first request is higher priority than the second request.

12. The system as recited in claim 10 wherein the switch is configured to select the first request prior to selecting the second request if the first and second requests are reorderable according to a set of ordering rules, and wherein the switch is configured not to select the first request ahead of the second request if the first and second requests are not reorderable according to the set of ordering rules even if the first request is higher priority than the second request.

13. The system as recited in claim 12 wherein the first agent is configured to transmit an indication with the first request indicative of whether or not the first request is reorderable with the second request, and wherein the switch is configured to select the first request prior to selecting the second request if the indication indicates that the first request is reorderable with the second request.

14. The system as recited in claim 8 wherein the switch is configured to determine a target agent of the plurality of agents for each request of the plurality of requests, and wherein, if one request of the plurality of requests is blocked based on the target agent of the request, the switch is configured to select another request to another target agent as the selected request.

15. The system as recited in claim 14 wherein the switch is configured to decode a portion of an address of each request of the plurality of requests to determine the target agent for the request.

16. The system as recited in claim 8 wherein the interconnect is an address interconnect.

17. The system as recited in claim 8 wherein the interconnect is a data interconnect.

18. A method comprising:
   queuing requests from a plurality of agents in a plurality of storage locations, wherein the requests comprise a first request transmitted by a first agent and a second request transmitted by the first agent prior to transmitting the first request;
   determining that the first request is from the first agent that previously transmitted the second request;
   arbitrating among the requests in the plurality of storage locations to select a selected request of the plurality of requests, wherein the first request includes an indication indicative of whether or not the first request is reorderable with the second request that was previously transmitted by the first agent, and wherein the arbitrating comprises selecting the first request as the selected request that is a winner of the arbitration prior to selecting the second request as the winner of the arbitration responsive to the indication indicating that the first request is reorderable with the second request and further responsive to determining that the first request is from the first agent that also transmitted the second request; and
   transmitting the selected request on an interconnect.

19. The method as recited in claim 18 wherein the plurality of storage locations comprise a plurality of queues, wherein each queue of the plurality of queues corresponds to a respective agent of the plurality of agents, and wherein each queue is configured to store a plurality of requests generated by the respective agent for transmission on the interconnect.

20. The method as recited in claim 18 wherein the selecting the first request is performed responsive to the first request being higher priority than the second request.

21. The method as recited in claim 18 wherein the selecting the first request is performed responsive to the first request being reorderable with the second request according to a set of ordering rules.

22. The method as recited in claim 18 wherein the interconnect is an address interconnect.

23. The method as recited in claim 18 wherein the interconnect is a data interconnect.

24. The switch as recited in claim 1 wherein the arbiter control circuit is further configured to determine the winner of the arbitration by enforcing a fairness algorithm based on monitoring selected requests from previous clock cycles.

25. The switch as recited in claim 24 wherein the winner is a lower priority request if previous requests were higher priority requests.

26. The switch as recited in claim 24 wherein the arbiter control circuit is configured to track credit usage for one or more target agents on the interconnect, and wherein the arbiter is configured to limit credit usage for higher priority requests to enforce the fairness algorithm.

* * * * *